Figure 1:
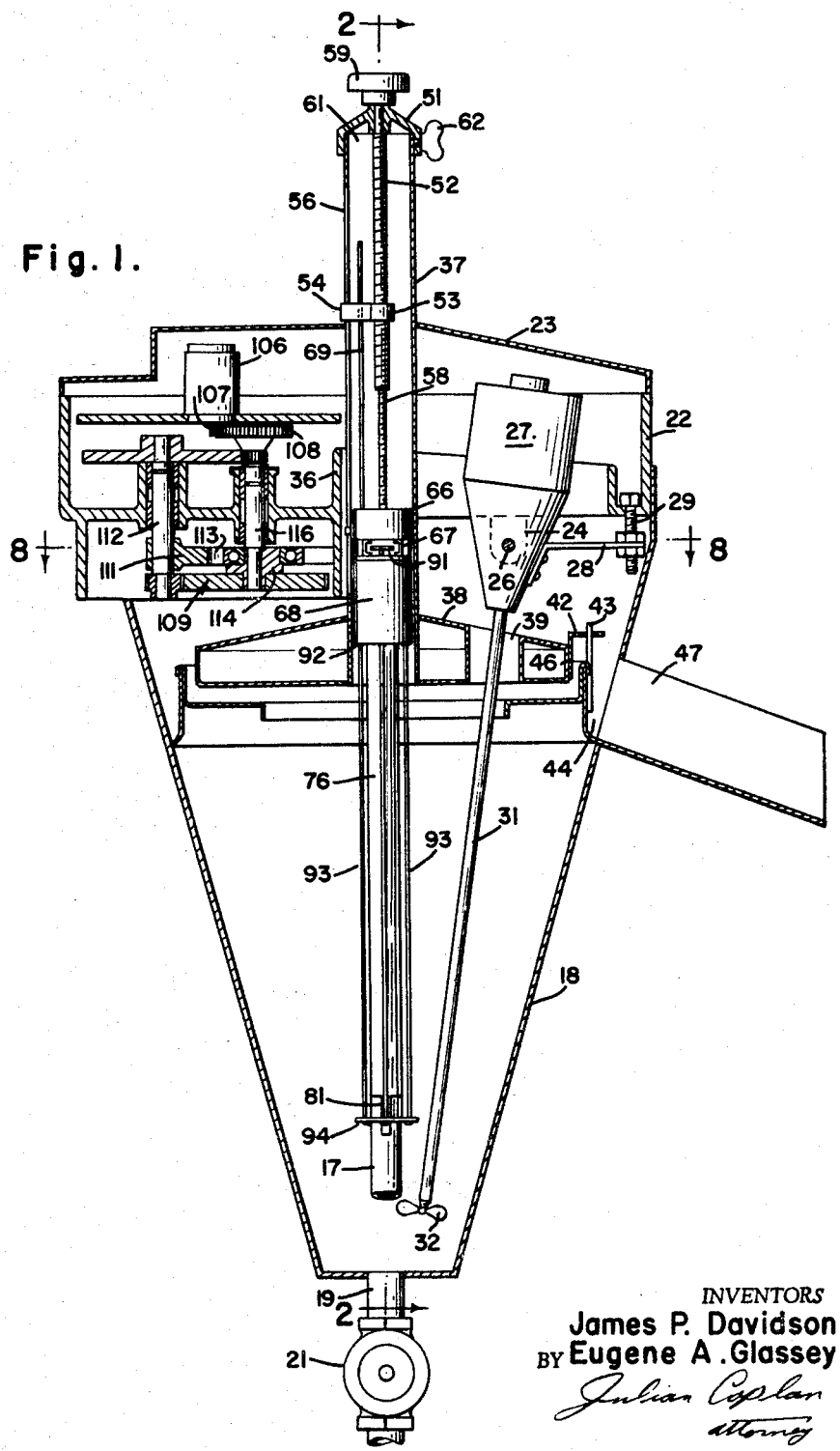

June 1, 1965    J. P. DAVIDSON ET AL    3,186,423
DENSITY CONTROL INSTRUMENT

Filed May 18, 1962    4 Sheets-Sheet 1

INVENTORS
James P. Davidson
BY Eugene A. Glassey

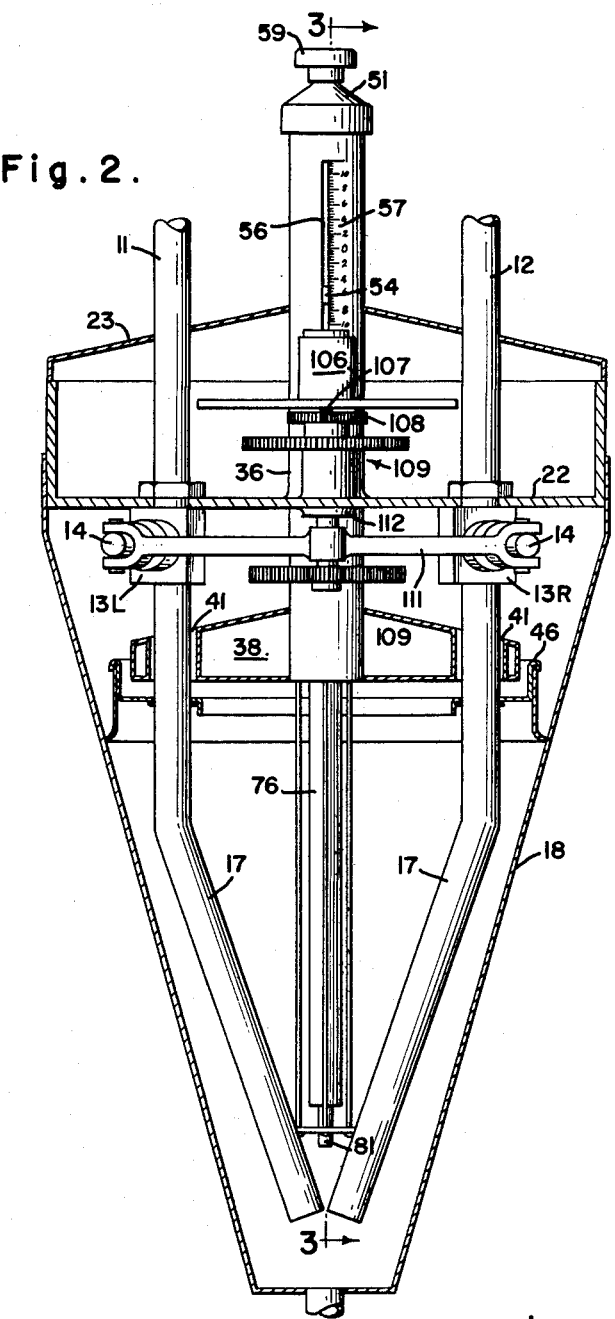

June 1, 1965   J. P. DAVIDSON ET AL   3,186,423
DENSITY CONTROL INSTRUMENT
Filed May 18, 1962   4 Sheets-Sheet 3
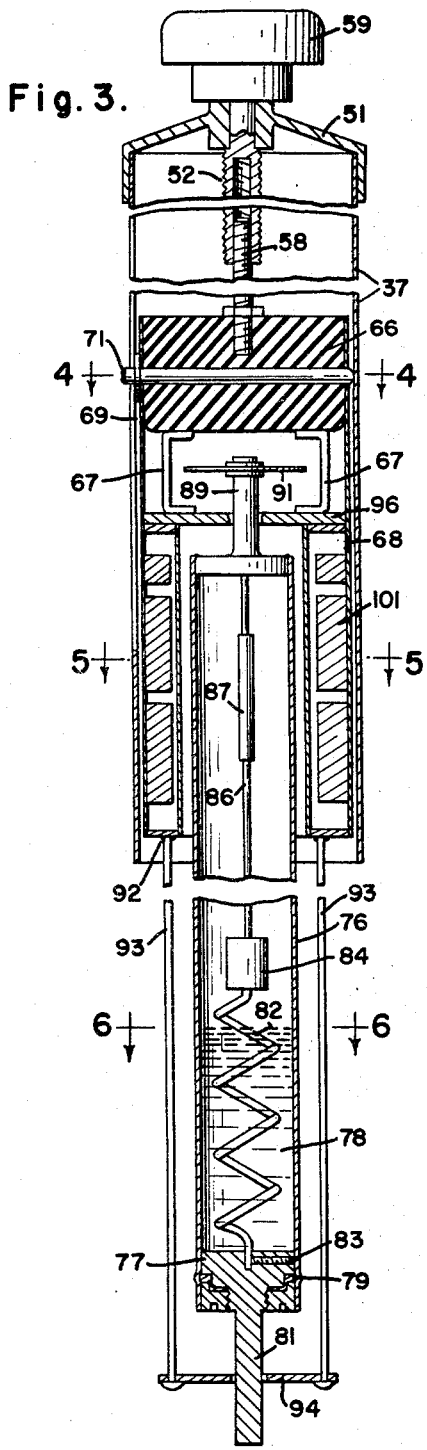
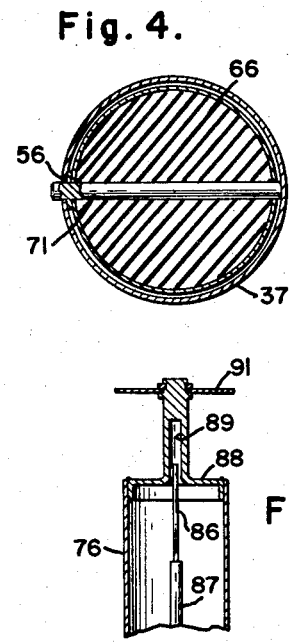
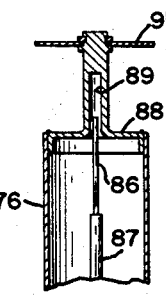
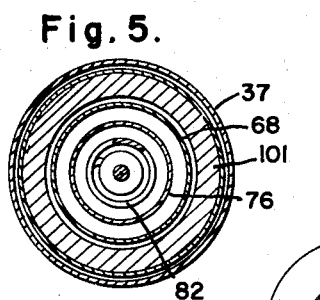
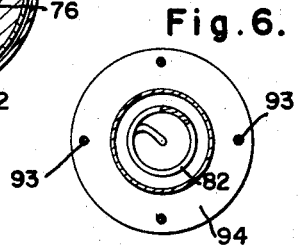
INVENTORS
James P. Davidson
Eugene A. Glassey
BY
Julian Caplan
attorney June 1, 1965  J. P. DAVIDSON ET AL  3,186,423
DENSITY CONTROL INSTRUMENT Filed May 18, 1962  4 Sheets-Sheet 4

INVENTORS
James P. Davidson
Eugene A. Glassey
BY
Julian Caplan
attorney

United States Patent Office 3,186,423
Patented June 1, 1965

3,186,423
DENSITY CONTROL INSTRUMENT
James P. Davidson and Eugene A. Glassey, Los Altos, Calif., assignors to Exactel Instrument Company, Mountain View, Calif.
Filed May 18, 1962, Ser. No. 195,697
7 Claims. (Cl. 137—91)

This invention relates to a new and improved density control instrument. Reference is made to co-pending patent application, Serial No. 43,431, now Patent No. 3,085,502, filed July 18, 1960, of which the present application is a continuation in part.

A hydrometer floating in the liquid whose density is to be controlled is provided with a magnetic core slidable within the coils of a differential transformer, the transformer being electrically connected to control a servomotor which, in turn, regulates the flow of two liquids of different density through inlet lines in such manner that variation in the density of the liquid under control causes adjustment of the valve openings in the intake lines to restore the liquid to a pre-determined density. Features of the present invention relate to means whereby automatic compensation is provided for variations in the rate of flow of liquid under test through the intsrument and for fluctuations in the temperature of the liquid.

Still another feature of the invention is the provision of improved means for manual adjustment of the pre-determined density.

One adaptation of the present invention is in cannery practice and, more specifically, in the adjustment of the sugar content in syrups filled into cans. From time to time, as the growing season progresses, the sugar content of the fruit changes and a more or less sweet syrup is required. Further, the sugar content of syrup used with different fruits must also be changed. It is, of course, well recognized that the density of the syrup is a measure of the sugar content thereof and, accordingly, density measurements by means of a hydrometer are conventional in cannery practice. Heretofore, such density control has been accomplished by measuring by means of a hydrometer the density of the contents of a tank discharging into the filler bowl of a can filling machine and then manually adjusting the flow of sugar solution or water entering the tank until the desired density is obtained. The present invention provides an automatic means for securing such control.

Although the invention is particularly suitable in cannery practice, nevertheless, the same apparatus may be used to control the density of many other fluids, such as brine solution, paint, and the like, where a relatively dense and a relatively non-dense liquid are mixed together at a preferred combined density.

A further advantage of the invention resides in the fact that automatic compensation is provided for flow conditions. It will be understood that the reading of a hydrometer in the sense of its absolute elevation depends to a considerable extent upon the rate of flow of the fluid through the container in which the hydrometer is floating. Thus, as hereinafter described in detail, the fluid under test flows over the edge of a weir. The rate of flow of fluid is a function of the height of fluid above the edge of the weir and hence the height of the hydrometer bulb (in an absolute sense) is likewise a function of the rate of flow. The present invention provides a float which floats upon the liquid under test in the region of the weir portion. This float houses the differential transformer inside in which the hydrometer and its armature are located. Hence, variation in the elevation of liquid flowing over the weir changes the elevation of the differential transformer to the same extent; thus automatic compensation is provided for rate of flow of fluid through the instrument.

Still another feature of the invention is the provision for temperature compensation. It will be understood that density is a function of temperature. Under many operating conditions the ambient temperature of the product may fluctuate greatly during the day. For example, in canneries the temperature at the commencement of operation may be 60° F. and may rise as high as 120° F. The present invention provides compensating means in the form of a link supporting the armature which expands and contracts responsive to temperature. The characteristics of the link are such that fluctuations in temperature cause variations in the elevation of the armature and this causes unbalance of the electrical circuit of the differential transformer. Accordingly, the present invention provides compensating means incorporated in the instrument to give proper density control regardless of variations in temperature.

A further feature and advantage of the present invention is the fact that the hydrometer is suspended in the fluid at a point adjacent to the point of mixing of the two fluids and directly in the stream of the liquid rather than in a container which merely samples a portion of the flow of the fluid. Hence, a more accurate reading is obtained and, further, the reading is more promptly responsive to any change in the rate of flow of the two fluids, or their respective densities.

Still another feature of the invention is the extremely close control obtained. Thus, in accordance with this invention a control of as low as $1/12$ Brix accuracy may be obtained and held substantially constant throughout an entire day's operation. When from time to time the Brix reading must be changed to adjust for such matters as the flavor of the fruit passing through the filling line, such adjustment is conveniently made by turning a knob which knob is connected to a screw arranged to raise or lower the differential transformer.

A particular advantage of the present invention is the fact that there is no direct mechanical transmission of the hydrometer elevation to the valve control means but, on the contrary, the valves are opened and closed by means of a servomotor which is, in turn, controlled by a differential transformer, the armature of which is housed in and responsive to the height of the hydrometer bulb.

Other objects of the present invention will become apparent upon reading the following specification and referring to the accompanying drawings in which similar characters of reference represent corresponding parts in each of the several views.

Figure 8:
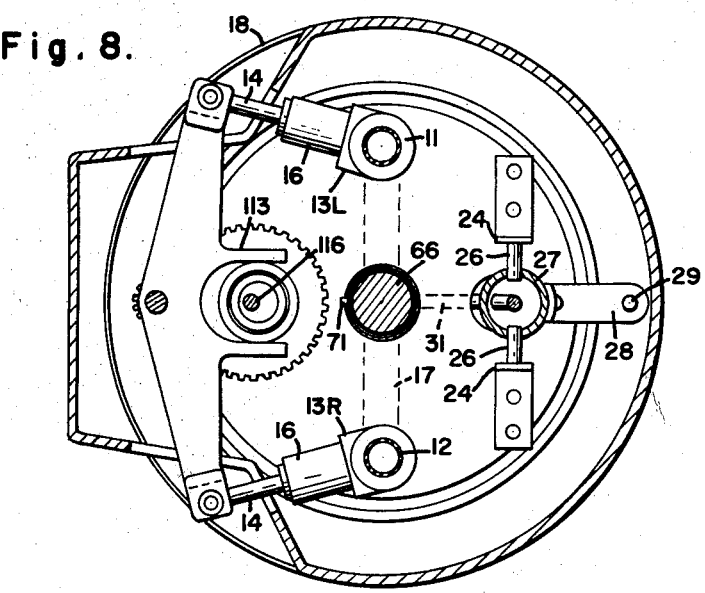
Figure 9:
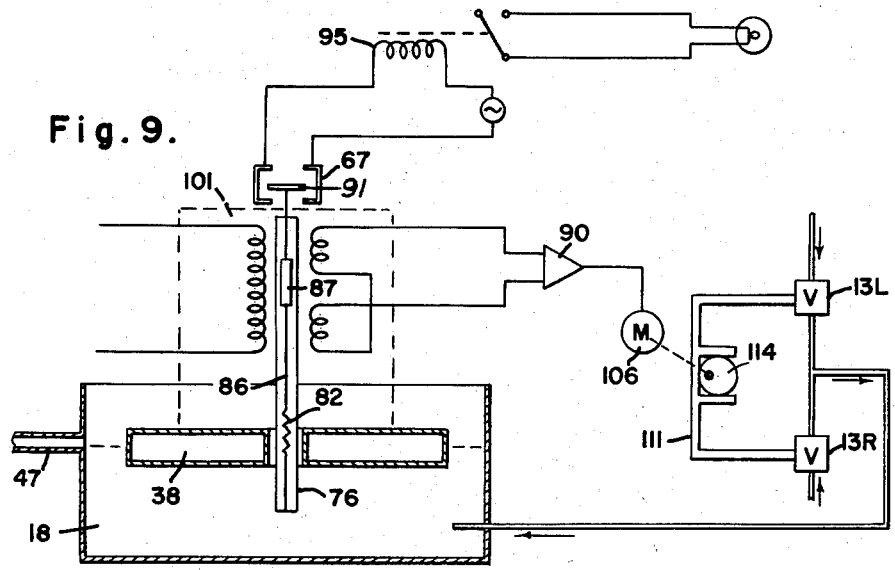

In the drawings:
FIG. 1 is a vertical sectional view through the instrument.
FIG. 2 is a view similar to FIG. 1, taken substantially along line 2—2 of FIG. 1.
FIG. 3 is an enlarged sectional view of a portion of the instrument taken substantially along line 3—3 of FIG. 2.
FIGS. 4, 5 and 6 are transverse sectional views taken substantially along corresponding lines of FIG. 3.
FIG. 7 is an enlarged fragmentary sectional view of a portion of the device.
FIG. 8 is a sectional view taken substantially along line 8—8 of FIG. 1.
FIG. 9 is an operational schematic.

The present invention is adaptable to control of density of a wide variety of products. For purpose of illustration, it will be assumed that the present invention is employed to control the density of sugar syrups of the type used in canneries. Mixture of such sugar syrups is accomplished by adding water to a high sugar content solution and mixing the water and high content sugar solution to produce a homogeneous syrup of the desired density. The mixed syrup is then discharged to the filler bowl of a can filling machine and then filled into cans of fruit, or the like. Various conditions may fluctuate and affect the desired sugar content of the liquid discharged into the filler bowl. For example, the sugar content of the high sugar fluid may vary, there may be variations in the pressure of the fluid in either the water or high sugar content line, the rate of flow required to keep the filler bowl at the desired level may change, and the temperature may vary during the day. In addition, adjustment may be needed to bring the density and hence the sugar content of the mixture to the desired level, depending upon the particular product being packed, or its degree of ripeness, or the like. Similarly, when other liquids are being controlled, operating conditions may be subject to similar variations, all of which are taken into account in the invention hereinafter described.

The apparatus hereinafter described uses a first fluid inlet line 11 and a second fluid inlet line 12, such as a line for high density sugar solution and for water, respectively. Installed in each line is a commercially available diaphragm-type valve 13L, 13R, which is well understood in the valve art. Each such valve has a stem 14 extending through a bonnet 16. By moving stem 14 in an axial direction, valve 13 may be opened and closed. The present invention provides means for opening and closing valves 13L, 13R, so that the relative flow of the two liquids in lines 11 and 12 are adjusted. Each of the lines 11, 12 has a tube 17 discharging into the bottom of a conical tank casing 18. Hence, the entire content of both fluid lines 11, 12 is discharged into tank 18 and thus a more accurate density reading is obtained than in other devices in which only a portion of the flow is sampled. Thus, tank 18 is of sufficient capacity so that an accurate and consistent control of density is attained. At the bottom of tank 18 is a drainage line 19 controlled by a valve 21, but it will be understood that the normal discharge of tank 18 is not through valve 21.

Mounted on top of tank 18 is a support frame 22 which is fixed relative to tank 18. Support frame 22 has a generally circular shape and is provided with a cover 23 to protect the various components mounted on the frame. Depending from a portion of frame 22 are ears 24 which provide support for horizontal gimbal pins 26 on which motor 27 is mounted. An arm 28 is fixed to motor 27 and is in threaded engagement with adjustment screw 29 also received in frame 22. Motor 27 carries an elongated rod 31 on the lower end of which is stirring blade 32. By turning adjustment screw 29 the angle of rod 31 and hence the position of blade 32 may be adjusted. Preferably, blade 32 is located in close proximity to the outlets of the two tubes 17 so that the two fluids discharged into tank 18 are mixed properly.

The lower end of tube 37 is fixed to float 38 which is a hollow member formed with vertical apertures 39, 41 for stirring rod 31 and for tubes 17. Float 38 carries a plurality of outwardly projecting arms 42 which are received in bifurcated vertical supports 43 mounted on trough 44. Trough 44 is located adjacent the top of tank 18 and its upper edge comprises annular weir 46, which is a plane of reference by which rate of flow of fluid through the tank is calculated, it being understood that the head of fluid above the weir edge 46 measures the flow. An outlet 47 is provided in tank 18 to accept the discharge of fluid over weir 46 and convey the same to the filler bowl or other receptacle into which the contents discharge. Thus, float 38 senses the level of fluid at weir 46 and outside tube 37 rises and falls as the level of fluid flowing over weir 46 changes. The upper end of outside tube 37 is provided with a cap 51 through which projects tubular screw 52 threaded both on the exterior and the interior. The pitch of the exterior threads is twice as great as that of the interior. A gauge nut 53 is threaded on the exterior of screw 52 and has an arm 54 provided with a pointer which projects out through vertical slot 56 in outside tube 37. Mounted on outside tube 37 adjacent slot 56 is a scale 57 which in cooperation with pointer arm 54 gives a density reading for the hydrometer. A threaded rod 58 is in engagement with the threads on the inside of screw 52. By turning knob 59 on the upper end of screw 52 rod 58 is caused to move up and down relatively to outside tube 37. A collar 61 and thumb screw 62 anchor cap 51 to outside tube 37 and facilitate the removal of inside parts for cleaning.

The lower end of rod 58 is fixed to contact block 66 supported by means of conductive contact brackets 67 above hollow, water-tight transformer casing 68. A vertical rod 69 projects up from contact blocks 66 and extends through outward projecting pointer arm 54 of nut 53. Vertical finger 69 prevents rotation of arm 54 and resultant change in position and indicated reading if parts are removed for cleaning. A pin 71 projects out from block 66 through slot 56 in outside tube 37, and hence contact block 66 is restrained from rotation relative to outside tube 37.

The equivalent of the hydrometer bulb, in accordance with the present invention, is a tube 76 vertically disposed within tank 18 and formed of a non-magnetic material such as aluminum. Located in the bottom of the tube 76 is a bottom end plug 77 and above plug 77 the tube is partially filled with a liquid 78 capable of heat transfer. The quantity of liquid 78 also affects the weight of the tube and hence adjusts the reference point at which the hydrometer floats. Plug 77 preferably is formed with a circumferential groove in which fits an O-ring 79 which jams against the inside of the tube 76, partially distorting the same to lock the plug in place. A depending extension 81 is provided for plug 77, the extension fitting down into the stream of fluid adjacent the bottom of tank 18 and being sensitive to the temperature of the tank. The upper end of plug 77 is connected to one end of a helical coil 82 of temperature sensitive material, the lower end of coil 82 being held in contact with the plug 77 by means of set screw 83. The helical coil 82 is immersed in liquid 78 and hence variation in temperature of the surrounding fluid in tank 18 causes expansion and contraction of the axial length of coil 82, thereby making its length responsive to temperature variations. The upper end of coil 82 is fixed to fitting 84 on the lower end of vertical rod 86 which carries a magnetic armature 87 or core adjacent its upper end. The upper end of tube 76 is closed by plug 88 having an upward hollow extension 89 into the hollow of which the upper end of rod 86 fits slidably. Adjacent the top of tip 89 is a horizontal disc 91 of an electrically conductive material which is normally midway between the contact brackets 67.

The entire hydrometer tube 76 is mounted concentrically with respect to casing 68 and tube 37. A fitting 92 on the lower end of casing 68 provides an attachment for downward extending guide rods 93 which extend to below the level of the lower end of hydrometer tube 76 and carry an annular disc 94 through which plug 81 fits. Although a tight fit between plug 81 and disc 94 is not desirable, nevertheless, disc 94 provides a guide to hold hydrometer tube 76 in substantially vertical alignment. Similarly, another annular disc 96 is provided on the interior of tube 68 as a guide for tip 89. Thus, tube 76 is vertically slidable relative to casing 68, but held concentric with respect thereto. A differential transformer 101 is located inside casing 68 and is electrically centered relative to armature 87. The leads from transformer 101 are connected to a servo-amplifier 90. Contacts 67 are shorted by disc 91 when tube 76 is abnormally elevated or depressed, thereby operating a relay 95 and stopping the processing.

Mounted on frame 22 is a servomotor 106 having a pinion 107 on its shaft engaging gear 108 of speed reduction gear train 109, which is also journaled in frame 22. A yoke-shaped member 111 is horizontally mounted on frame 22 by pivot 112 on frame 22 having yoke arm 113 receiving eccentric cam 114. Cam 114 is mounted on vertical shaft 116 which is driven by the gear train 109. Outer ends of yoke member 111 receive the ends of valve stems 14. Hence, turning of servomotor 106 turns cam 114 and this causes yoke member 111 to pivot around its pivot 112. Pivoting of the yoke member in one direction closes one valve 13 and opens the other, and vice versa.

The operation of the instrument is as follows: If there is a change in density of the combined fluid in tank 18, such change in density affects the vertical position of inner tube 76 and hence of armature 87. Any variation in the elevation of armature 87 causes a change in the output of differential transformer 101, depending upon the direction in which the transformer is unbalanced. The output of the transformer 101 is amplified by servo-amplifier 90 and the output of the amplifier is in turn fed into servomotor 106, causing the same to turn in the direction to open one of valves 13 and close the other valve to restore the balance of differential transformer 101 and hence to restore the density of the fluid to the desired point. If, from time to time, it is necessary to change the density setting of the instrument, knob 59 is turned causing differential transformer 101 to be raised or lowered relative to outer tube 37 and the reading on scale 57 to indicate the new density reading.

If there is a change in the rate of flow through the instrument, such change is sensed by float 38 positioned at weir 46 and changes in the elevation of float 38 cause outer tube 37 to be raised or lowered, thereby in turn raising and lowering differential transformer 101. The change in elevation of float 38 due to variation in flow parallels the elevation change of inner tube 76. Thus, the electrical center of the differential transformer 101 and armature 87 remain in conjunction and no signal is presented to the servomotor, thereby making the instrument accuracy independent of flow variations.

If there is a change in temperature of the fluid, such change is sensed by helical coil 82 in inner tube 76 and this causes armature 87 to be raised or lowered to compensate for such variation. The helical coil 82 is so arranged that it raises the vertical position of armature 87 an amount equal to the drop in position of inner tube 76, as the temperature raises and vice versa, as the liquid temperature drops, thereby making the instrument accuracy independent of temperature variations.

Accordingly, the instrument may give any desired density output as read on scale 57 within a broad range and holds such density constant despite change in rate of flow of fluid and variations in temperature and density of the two input fluids.

Although the foregoing invention has been described in some detail, by way of illustration and example for purposes of clarity of understanding, it is understood that certain changes and modifications may be practiced within the spirit of the invention and scope of the appended claims.

What is claimed is:

1. In a density sensing control instrument of the type which comprises a tank, at least two tubes discharging into said tank conveying into said tank fluids of different densities and wherein the density of the combined fluid in said tank is dependent upon the relative flow through said tubes, a hydrometer tube suspended in the combined fluid in said tank, an armature movable with said hydrometer tube, a differential transformer surrounding and normally centered relative to said armature, and a servomotor energized responsive to the position of said armature relative to said transformer, the improvement which comprises a weir in said tank, a discharge outlet outside said weir, a float floating on said combined fluid as it passes over said weir, means for raising and lowering said transformer responsive to said float, and a link in said hydrometer tube, said link being fixed at one end to said tube variable in length dependent upon temperature, said armature being mounted on the other end of said link; an electrical circuit having spaced contacts movable with said transformer and a circuit breaking device operable upon shorting of said contacts, a conductive element movable with said hydrometer tube and ararnged to short said contacts to actuate said circuit breaking device when said hydrometer tube fluctuates relative to said transformer beyond predetermined limits governed by spacing of said contacts.

2. In a density sensing control instrument of the type which comprises a tank, at least two tubes discharging into said tank conveying into said tank fluids of different densities and wherein the density of the combined fluid in said tank is dependent upon the relative flow through said tubes, a hydrometer tube suspended in the combined fluid in said tank, an armature movable with said hydrometer tube, a differential transformer surrounding and normally centered relative to said armature, and a servomotor energized responsive to the position of said armature relative to said transformer, the improvement which comprises an inlet of restricted cross-section at the bottom of said tank, said tank increasing in cross-section toward the top, a weir near the top of said tank of substantially greater perimeter than said inlet, a discharge outlet for said tank outside said weir, an annular float of a size slightly less than said weir floating adjacent and within said weir on said combined fluid as it passes over said weir, said transformer within said float and raised and lowered by said float responsive to flow over said weir.

3. An instrument according to claim 2, which further comprises means for raising and lowering said transformer relative to said float and manual adjustment means for said last named means.

4. In a density sensing control instrument of the type which comprises a tank, at least two tubes discharging into said tank conveying into said tank fluids of different densities and wherein the density of the combined fluid in said tank is dependent upon the relative flow through said tubes, a hydrometer tube suspended in the combined fluid in said tank, an armature movable with said hydrometer tube, a differential transformer surrounding and normally centered relative to said armature, and a servomotor energized responsive to the position of said armature relative to said transformer, the improvement which comprises an inlet of restricted cross-section at the bottom of said tank, said tank increasing in cross-section toward the top, a weir near the top of said tank of substantially greater perimeter than said inlet, a discharge outlet for said tank outside said weir, an annular float of a size slightly less than said weir floating adjacent and within said weir on said combined fluid as it passed over said weir, said transformer within said float and raised and lowered by said float responsive to flow over said weir; a link in said hydrometer tube, said link being fixed at one end to said tube variable in length dependent upon temperature, said armature being mounted on the other end of said link.

5. An instrument according to claim 4, which further comprises manually adjustable means for raising and lowering said transformer relative to said hydrometer tube.

6. In a density sensing control instrument of the type which comprises a tank, at least two tubes discharging into said tank conveying into said tank fluids of different densities and wherein the density of the combined fluid in said tank is dependent upon the relative flow through said tube, and a servomotor the improvement which comprises a sealed hydrometer tube in said tank, guide means for holding said hydrometer tube upright whereby the elevation of said hydrometer tube is dependent on density of said combined fluid, an armature carried by the upper end of said hydrometer tube, an annular casing around the upper end of said hydrometer tube, a vertically disposed outer tube around the outside of said casing, means restraining relative rotation of said outer tube and said casing, manually adjustable means for raising and lowering said casing comprising first threaded means on said outer tube, second threaded means engaging said first threaded means and mounted on said casing, and a knob on said outer tube for turning said first threaded means, a differential transformer in said casing normally electrically centered relative to said armature, said servomotor being energized by said transformer.

7. A density control instrument according to claim 6, which further comprises a weir in said tank and a float positioned to float on said combined fluid as it passes over said weir, whereby said float is responsive to rate of flow through said instrument, said outer tube being fixed for movement with said float.

References Cited by the Examiner
UNITED STATES PATENTS

| | | | |
|---|---|---|---|
| 1,691,084 | 11/28 | Schwartz | 73—447 |
| 2,185,205 | 1/40 | Linebarger | 73—449 |
| 2,664,011 | 12/53 | Boonshaft | 73—452 |
| 2,853,881 | 9/58 | Chandler | 73—449 |

ISADOR WEIL, *Primary Examiner*

MARTIN P. SCHWADRON, *Examiner.*